United States Patent Office 3,475,473
Patented Oct. 28, 1969

3,475,473
PROCESS FOR PREPARING TRIORGANO-
TIN HALIDES AND BIS(TRIORGANOTIN)
OXIDES
Tadasu Tahara, Osaka-shi, and Tadashi Takubo and Isao Hachiya, Amagasaki-shi, Japan, assignors to Nitto Kasei Co., Ltd., Osaka, Japan, a corporation of Japan
No Drawing. Filed Oct. 10, 1967, Ser. No. 674,121
Claims priority, application Japan, Oct. 11, 1966, 41/66,412
Int. Cl. C07f 7/22
U.S. Cl. 260—429.7                 3 Claims

ABSTRACT OF THE DISCLOSURE

This invention relates to a process of preparing tri-substituted organotin halides having the general formula $$R_pR'_qSnX$$

wherein R is selected from the group consisting of alkyl, cycloalkyl, and aryl, R' is selected from the group consisting of alkyl and cycloalkyl, X is a halogen, each of $p$ and $q$ is an integer 1–2, and the total of $p$ and $q$ is 3, which comprises reacting in the presence of zinc and a catalytic amount of alcohol an organotin halide of the general formula $$R_pSnX_{4-p}$$

wherein R, X, and p have the meanings given above with a compound of the formula $$R'X$$

wherein R' and X have the meanings given above.

This invention relates to a process for the preparation of symmetrically or asymmetrically substituted triorganotin halides.

The demand for trialkyltin and triaryltin compounds has been increasing due to their use as the active ingredient in bactericides, insecticides, fungicides, agricultural chemicals, antifouling paints, etc. Organotin compounds of the R₃SnX type have been manufactured in accordance with prior art practices, by the disproportionation reaction of R₄Sn (produced from RM$_g$X and SnX₄) with SnX₄. In the Grignard reaction large quantity of ether solvent has been used and this has generated a considerable fire hazard; in addition, the process uses such expensive raw materials as SnX₄ and magnesium that increase the overall cost of manufacture of the product compound. On the other hand, the manufacture of R₃SnI by the reaction of R₂SnI₂ with RI in the presence of zinc takes as much time as 10 to 20 hours; in addition the product is a mixture of R₄Sn, R₃SnI, and R₂SnI₂ — and the yield of R₃SnI is low. Such methods appear not to be useful for industrial scale production.

We have now found that the presence of an catalytic amount of alcohol in the reaction of the latter type improves remarkably the yield of triorganotin halides.

It is an object of this invention to provide a process of preparing in high yield symmetrically or asymmetrically substituted triorganotin halides having the general formula $$R_pR'_qSnX$$

wherein R is selected from the group consisting of alkyl, cycloalkyl, and aryl, R' is selected from the group consisting of alkyl and cycloalkyl, X is a halogen, each of $p$ and $q$ is an integer 1–2, and the total of $p$ and $q$ is 3.

In accordance with certain of its aspects, this invention relates to the process of preparing tri-substituted organotin halides having the general formula $$R_pR'_qSnX$$

wherein R is selected from the group consisting of alkyl, cycloalky, and aryl, R' is selected from the group consisting of alkyl and cycloalkyl, X is a halogen, each of $p$ and $q$ is an integer 1–2, and the total of $p$ and $q$ is 3, which comprises reacting in the presence of zinc and a catalytic amount of alcohol an organotin halide of the general formula $$R_pSnX_{4-p}$$

wherein R, X, and p have the meanings given above with a compound of the general formula $$R'X$$

wherein R' and X have the meanings given above.

The process of this invention is completed in remarkably reduced time-usually three hours hardly to decompose alkyl halides, etc. during heat reaction, and the product is obtained in a high yield.

In the process of this invention, the reaction runs step by step, and a suitable amount of zinc may facilitate the introduction of one alkyl radical into a di-substituted organotin dihalide. This indicates that asymmetrically substituted triorganotin compounds can be easily manufactured, the industrial scale production of which has been considered difficult.

In the compound $R_pSnX_{4-p}$, R may be an alkyl radical such as methyl, ethyl, propyl, butyl, amyl, octyl radical, or cycloalkyl radical such as cyclohexyl radical or aryl radical such as phenyl, tolyl, p-chlorophenyl radical. In the compound R'X, R' may be an alkyl radical such as methyl, ethyl, propyl, butyl, amyl, octyl radical, or cycloalkyl radical such as cyclohexyl radical. Alkyl or cycloalkyl radical or R and R' may be either identical with or different from each other. X is a halogen atom such as chlorine, bromine, or iodine atom.

Alcohol used as a catalyst in this invention includes, for example, primary alcohol such as methyl, ethyl, butyl, octyl alcohol, and secondary alcohol such as isopropyl, secondary butyl, cyclohexyl alcohol, and tertiary alcohol such as tertiary butyl alcohol, and polyhydric alcohol such as ethylene glycol, glycerine. The sufficient amount used of alcohol is 0.1–4% by weight based on the weight of compound $R_pSnX_{4-p}$.

In performing this invention, above metioned raw materials may be heated and reacted in the presence of zinc and a catalytic amount of alcohol. The use of solvent is usually not necessary, although solvent may be used if desired.

The product compound $R_pR'_qSnX$ is obtained in high purity, and directed to various applications by itself. If desired it can be hydrolyzed to the corresponding oxide.

EXAMPLE 1

In a 1 liter three-necked flask equipped with a stirrer, reflux condenser and thermometer, 244 g. of dibutyltin diiodide, 166 g. of butyl iodide, 39.0 g. of powdered zinc, and 2.0 g. of n-butyl alcohol each were placed and the mixture heated to 125°–130° C. for 3 hours. After the reaction, the reaction mixture was distilled at reduced pressure to recover excess butyl iodide, and 400 ml. of 10% hydrochloric acid was added while cooling to dissolve zinc iodide which formed and unreacted zinc. The organic layer was separated, and then the obtained tributyltin iodide was treated with caustic soda solution to yield 136 g. (91.4%) of bis-tributyltin oxide and 2.3 g. (1.8%) of solid dibutyltin oxide as a by-product. In gaschromatographic analysis, this product proved to contain 3.1% of tetrabutyltin, and to be more than 96% pure bis-tributyltin oxide.

EXAMPLE 2

In the same flask as used in Example 1, 138 g. of dipropyltin dichloride, 146 g. of propyl iodide, 39.0 g. of powdered zinc, and 1.5 g. of n-propl alcohol were placed and reacted for 3 hours at 120°–125° C. The same procedure as in Example 1 was followed, and 127 g. of tripropytin chloride (B.P. 118°–120° C./10 mm. Hg.) was obtained by the distillation at reduced pressure. The product contained 2.7% of tetrapropyltin, and the yield of tripropyltin chloride was 90.1%.

EXAMPLE 3

A mixture of 244 g. of dibutyltin diiodide, 71.1 g. of ethyl iodide, 49.5 g. of ethyl bromide, 39.0 g. of powdered zinc, and 1.5 g. of ethylene glycol was reacted for 4 hours at 80°–100° C. The same procedure as in Example 1 was followed, and the thus obtained dibutyl ethyltin iodide was treated with caustic soda solution to yield 123 g. (90.2%) of bis(dibutyl ethyltin) oxide.

EXAMPLE 4

A mixture of 28 g. of butyltin triiodide, 219 g. of dibutyltin diiodide, 184 g. of butyl iodide, 39.0 g. of powdered zinc, 2.4 g. of tertiary butyl alcohol was reacted for 3 hours at 125°–130° C. The same procedure as in Example 1 was followed, and the thus obtained tributyltin iodide was treated with caustic soda solution to yield 132 g. (88.6%) of bis-tributyltin oxide and 3.2 g. of byproduct, dibutyltin oxide. Bis-tributyltin oxide contained 3.8% of tetrabutyltin and the purity was more than 95%.

EXAMPLE 5

A mixture of 172 g. of diphenyltin dichloride, 122 g. of methyl iodide, 39.0 g. of powdered zinc, and 1.5 g. of iso-propyl alcohol was reacted for 3 hours at 50°–100° C. The same procedure as in Example 1 was followed, and 133 g. (82.1%) of diphenyl methyltin chloride.

EXAMPLE 6

A mixture of 269 g. of dicyclohexyltin diiodide, 130 g. of ethyl iodide, 39.0 g. of powdered zinc, and 1.8 g. of cyclohexyl alcohol was reacted for 3 hours at 80°–100° C. The same procedure as in Example 1 was followed, and the obtained dicyclohexyl ethyltin iodide was treated with alkaline solution to yield 135 g. (84.0%) of bis-dicyclohexyl ethyltin oxide.

We claim:
1. A process of preparing tri-substituted organotin halides having the general formula

$$R_pR'_qSnX$$

wherein R is selected from the group consisting of alkyl, cycloalkyl, and aryl, R' is selected from the group consisting of alkyl and cycloalkyl, X is a halogen, each of $p$ and $q$ is an integer 1–2, and the total of $p$ and $q$ is 3, which comprises reacting in the presence of zinc and a catalytic amount of alcohol an organotin halide of the general formula $$R_pSnX_{4-p}$$

wherein R, X, and p have the meanings given above with a compound of the formula $$R'X$$

wherein R' and X have the meanings given above.

2. A process as claimed in claim 1 wherein R is selected from the group consisting of propyl, butyl, cyclohexyl, and phenyl, R' is selected from the group consisting of methyl, ethyl, propyl, and butyl, and X is selected from the group consisting of iodine, bromine, and chlorine.

3. A process of preparing bis-tributyltin oxide which comprises reacting butyltin triiodide, dibutyltin diiodide, butyl iodide, and zinc in the presence of alcohol to produce trbutyltin iodide and then hydrolyzing said tri-butyltin iodide with a base to produce bis-tributyltin oxide.

References Cited
UNITED STATES PATENTS

| 3,082,230 | 3/1963 | Dorfelt et al. | 260—429.7 |
| 3,080,408 | 3/1963 | Andreas et al. | 260—429.7 |
| 3,085,101 | 4/1963 | Yatagai et al. | 260—429.7 |
| 3,100,215 | 8/1963 | Gelbert | 260—429.7 |
| 3,198,819 | 8/1965 | Gloskey | 260—429.7 |
| 3,251,871 | 5/1966 | Dorfelt | 260—429.7 |
| 3,287,386 | 11/1966 | Neuman | 260—429.7 |
| 3,387,011 | 6/1968 | Coates et al. | 260—429.7 |
| 3,387,012 | 6/1968 | Jasching et al. | 260—429.7 |
| 3,340,283 | 9/1967 | Gloskey | 260—429.7 |
| 3,414,595 | 12/1968 | Oakes | 260—429.7 |

TOBIAS E. LEVOW, Primary Examiner

W. F. W. BELLAMY, Assistant Examiner